United States Patent
Kishida et al.

(10) Patent No.: US 9,232,120 B2
(45) Date of Patent: Jan. 5, 2016

(54) IMAGE PROCESSOR

(71) Applicant: Panasonic Corporation, Osaka (JP)

(72) Inventors: Yuki Kishida, Osaka (JP); Katsuji Kunisue, Osaka (JP); Hisako Chiaki, Nara (JP); Ryoji Asada, Osaka (JP)

(73) Assignee: Panasonic Intellectual Property Management Co., Ltd, Osaka (JP)

( * ) Notice: Subject to any disclaimer, the term of this patent is extended or adjusted under 35 U.S.C. 154(b) by 53 days.

(21) Appl. No.: 13/872,227

(22) Filed: Apr. 29, 2013

(65) Prior Publication Data

US 2014/0232908 A1    Aug. 21, 2014

(30) Foreign Application Priority Data

Feb. 20, 2013 (JP) .................... 2013-030717
Apr. 4, 2013 (JP) .................... 2013-078655

(51) Int. Cl.

| H04N 5/217 | (2011.01) |
|---|---|
| H04N 5/232 | (2006.01) |
| H04N 5/357 | (2011.01) |
| G06T 5/00 | (2006.01) |
| H04N 5/235 | (2006.01) |
| H04N 5/353 | (2011.01) |

(52) U.S. Cl.
CPC ......... *H04N 5/2173* (2013.01); *H04N 5/23229* (2013.01); *H04N 5/357* (2013.01); *G06T 5/001* (2013.01); *H04N 5/2354* (2013.01); *H04N 5/3532* (2013.01)

(58) Field of Classification Search
CPC . H04N 5/2256; H04N 5/2354; H04N 5/2173; H04N 5/23229; H04N 5/3532; H04N 5/357; G06T 5/001

USPC ........ 348/207.99, 222.1, 224.1, 226.1, 229.1, 348/234, 239, 241, 370, 371, 700, 701; 375/240.01, 240.25, 240.26; 382/236; 396/310; 386/52

See application file for complete search history.

(56) References Cited

U.S. PATENT DOCUMENTS

| 6,580,829 | B1 * | 6/2003 | Hurst et al. ............... 382/236 |
|---|---|---|---|
| 2002/0047936 | A1 * | 4/2002 | Tojo ......................... 348/700 |
| 2002/0176010 | A1 * | 11/2002 | Wallach et al. ......... 348/229.1 |
| 2006/0018653 | A1 * | 1/2006 | Kido ......................... 396/310 |
| 2006/0083299 | A1 * | 4/2006 | Kitajima ............... 375/240.01 |
| 2006/0152634 | A1 * | 7/2006 | Yeh et al. .................. 348/701 |
| 2007/0140356 | A1 * | 6/2007 | Wada .................. 375/240.26 |
| 2008/0232765 | A1 * | 9/2008 | Patten et al. ................ 386/52 |
| 2009/0245386 | A1 * | 10/2009 | Chen et al. ............ 375/240.25 |
| 2010/0091141 | A1 * | 4/2010 | Martinez et al. ........... 348/234 |

(Continued)

FOREIGN PATENT DOCUMENTS

WO    2010/100866 A1    9/2010

*Primary Examiner* — Dennis Hogue
(74) *Attorney, Agent, or Firm* — Renner, Otto, Boisselle & Sklar, LLP

(57) ABSTRACT

Disclosed is an image processor that reduces or eliminates the effects of a flash band regardless of performing a shutter operation or not. An imaging device includes a flash band detector configured to determine whether each image of the consecutive images shown by image signals output from an imager is a flash band image a part of which is affected by a flash, and a flash band compensator configured to, if a first image is determined as the flash band image, generate a third image which is supposed where the third image is fully affected by a flash by using a second image which is not determined as the flash band image, and output the third image instead of the first image.

7 Claims, 6 Drawing Sheets

(56) References Cited

U.S. PATENT DOCUMENTS

| | | | |
|---|---|---|---|
| 2010/0110225 A1* | 5/2010 | Wada et al. | 348/226.1 |
| 2011/0001849 A1* | 1/2011 | Wada et al. | 348/241 |
| 2011/0273591 A1* | 11/2011 | Fukushima | 348/239 |
| 2011/0317029 A1* | 12/2011 | Fukui et al. | 348/224.1 |
| 2012/0026359 A1* | 2/2012 | Fukushima et al. | 348/226.1 |
| 2012/0188403 A1* | 7/2012 | Gomita | 348/226.1 |
| 2013/0208149 A1* | 8/2013 | Kamiya | 348/241 |

* cited by examiner

FIG.4A  INPUT In: In1, In2, In3, In4

FIG.4B  FLASH BAND DETERMINATION INFORMATION J: J1=0, J2=1, J3=0, J4=0

FIG.4C  MEMORY OUTPUT M: M1 (=In1), M2 (=In1), M3 (=In3), M4 (=In4)

FIG.4D  OUTPUT Out: Out1 (=M1), Out2 (=M1'), Out3 (=M3), Out4 (=M4)

FIG. 7A  INPUT In
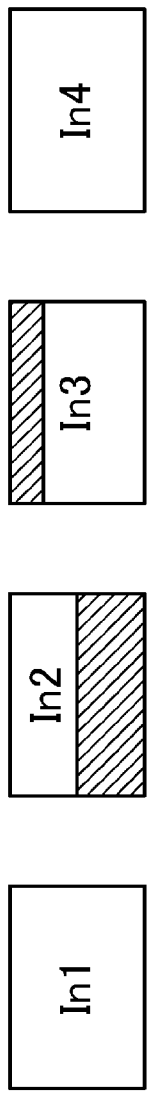
FIG. 7B  FLASH BAND DETERMINATION INFORMATION J
J1=0   J2=1   J3=1   J4=0
FIG. 7C  MEMORY OUTPUT M
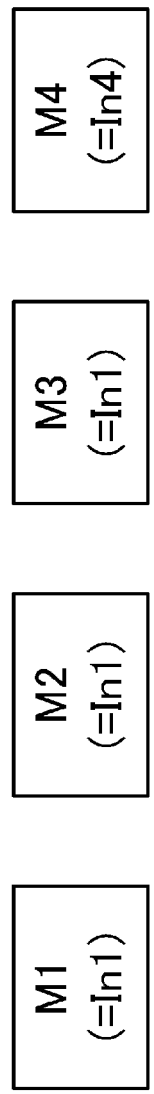
FIG. 7D  OUTPUT Out
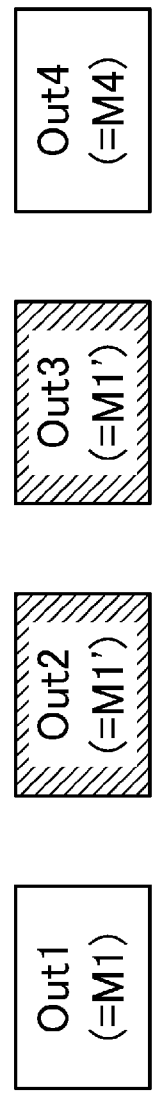

FIG.8A INPUT In 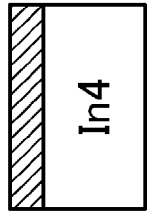 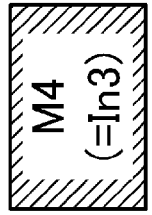 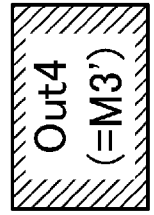
In1    In2    In3    In4
FIG.8B FLASH BAND DETERMINATION INFORMATION J
J1=0   J2=1   J3=0   J4=1
FIG.8C MEMORY OUTPUT M 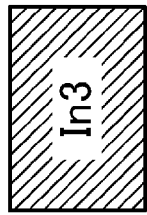 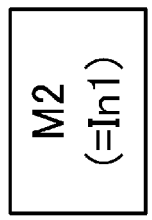 
M1 (=In1)   M2 (=In1)   M3 (=In3)   M4 (=In3)
FIG.8D OUTPUT Out 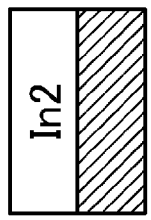 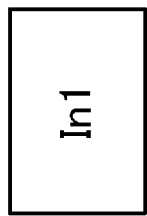 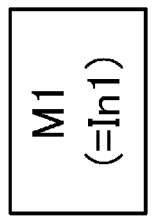 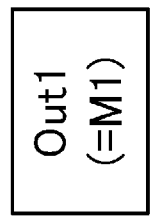
Out1 (=M1)   Out2 (=M1')   Out3 (=M3)   Out4 (=M3')

IMAGE PROCESSOR

CROSS-REFERENCE TO RELATED APPLICATION

This application claims priority to Japanese Patent Applications No. 2013-030717 filed on Feb. 20, 2013, and No. 2013-078655 filed on Apr. 4, 2013, the entire disclosure of which is incorporated by reference herein.

BACKGROUND

The present disclosure relates to image processors represented by imaging devices such as digital cameras and video cameras (camcorders) for capturing consecutive images.

Many complementary metal oxide semiconductor (CMOS) imaging elements use a rolling shutter technique for allowing exposure to sequentially start for each horizontal line (hereinafter referred to as "line"), and sequentially reading image signals of respective lines to form a frame. In the imaging element using the rolling shutter technique, the starting time and ending time of the exposure period differ for each line. Therefore, if an external flash etc. is used during a period that is shorter than one frame period, a band of high luminance (a flash band) may appear on an output image of the imaging element.

International Patent Publication No. WO 2010/100866 discloses a technique for compensating for a flash band by adding image signals of two consecutive frames affected by flash.

SUMMARY

The present disclosure provides an image processor that can reduce an adverse effect due to flash regardless of performing a shutter operation or not.

An image processor of the present disclosure processes consecutive images, and includes: a determiner configured to determine whether each image of the consecutive images is a flash band image a part of which is affected by a flash; and a compensator configured to, if a first image is determined as the flash band image by the determiner, generate a third image which is supposed where the third image is fully affected by a flash by using a second image which is not determined as the flash band image, and output the third image instead of the first image.

The image processor of the present disclosure can reduce or eliminate the effects of a flash band regardless of performing a shutter operation or not.

BRIEF DESCRIPTION OF THE DRAWINGS

FIGS. 4A, 4B, 4C, and 4D illustrate the operation of the flash band compensator of FIG. 1 in the operation example 1.

FIGS. 7A, 7B, 7C, and 7D illustrate the operation of the flash band compensator of FIG. 1 in the operation example 2.

FIGS. 8A, 8B, 8C, and 8D illustrate the operation of the flash band compensator of FIG. 1 in an operation example 3 where a frame to which full-frame flash is emitted is provided between two frames each including a flash band in the image signal In of FIG. 1.

DETAILED DESCRIPTION

Embodiments are described in detail below with reference to the attached drawings. However, unnecessarily detailed description may be omitted. For example, detailed description of well-known techniques or description of the substantially same elements may be omitted. Such omission is intended to prevent the following description from being unnecessarily redundant and to help those skilled in the art easily understand it.

Inventor(s) provides the following description and the attached drawings to enable those skilled in the art to fully understand the present disclosure. Thus, the description and the drawings are not intended to limit the scope of the subject matter defined in the claims.

First Embodiment

1-1. Configuration

1-1-1. General Configuration of Imaging Device

First, an imaging device in a first embodiment will be described. A technique for compensating for a flash band in the present disclosure is applied to an image processor, and in this embodiment, the imaging device will be described as one example of the image processor.

Figure 1:
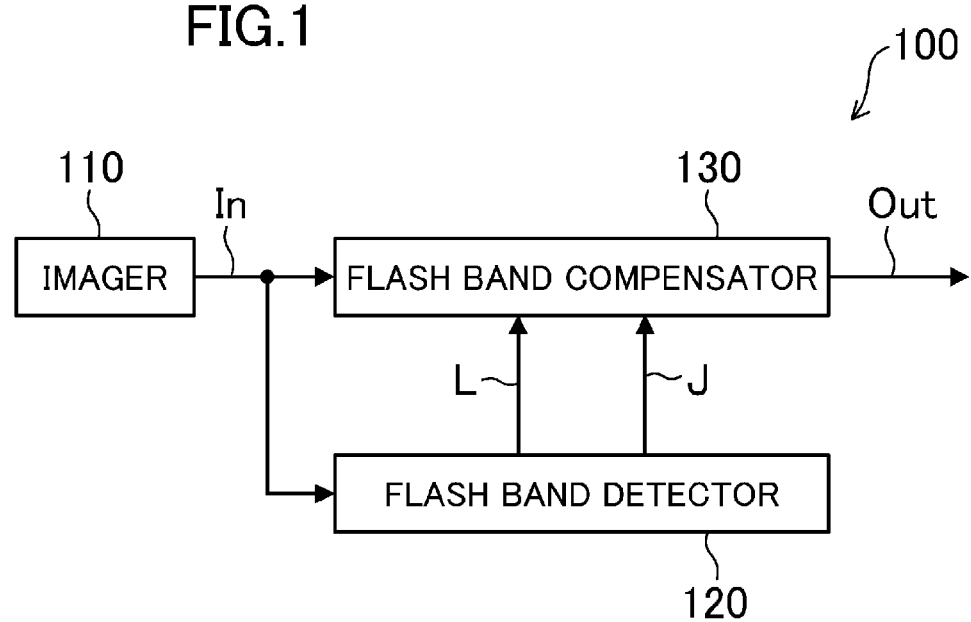
FIG. 1 illustrates a general configuration of an imaging device that is an example of an image processor according to a first embodiment.

FIG. 1 illustrates the configuration of an imaging device 100 in the first embodiment. In FIG. 1, the imaging device 100 includes an imager 110 configured to image an object to generate an image signal, a flash band detector 120 configured to detect presence or absence of a flash band, and a flash band compensator 130 configured to correct the flash band based on flash band detection information.

The imager 110 has a CMOS image sensor (imaging elements), a sensor drive circuit, and an analog/digital converter. The imager 110 converts light from an object into electric signals by photoelectric conversion, and supplies the flash band detector 120 and the flash band compensator 130 with an image signal In as a digital image signal.

The flash band detector 120 detects presence or absence of a flash band based on the image signal In input from the imager 110, and outputs flash band determination information J showing presence or absence of a flash band, and a flash band level L to the flash band compensator 130. The flash band level L means luminance of a flash band. In this embodiment, if there is a flash band, the flash band determination information J is expressed as follows: J=1. If there is no flash band, the flash band determination information J is expressed as follows: J=0. The flash band detector 120 sets a threshold value and detects presence or absence of a flash band, and a thin flash band can be neglected and the flash band determination information J can be considered as 0.

The flash band compensator 130 outputs an images Out depending on presence or absence of a flash band by utilizing the image signal In of the imager 110, the flash band determination information J and the flash band level L of the flash band detector 120.

1-1-2. Configuration of Flash Band Compensator

Figure 2:
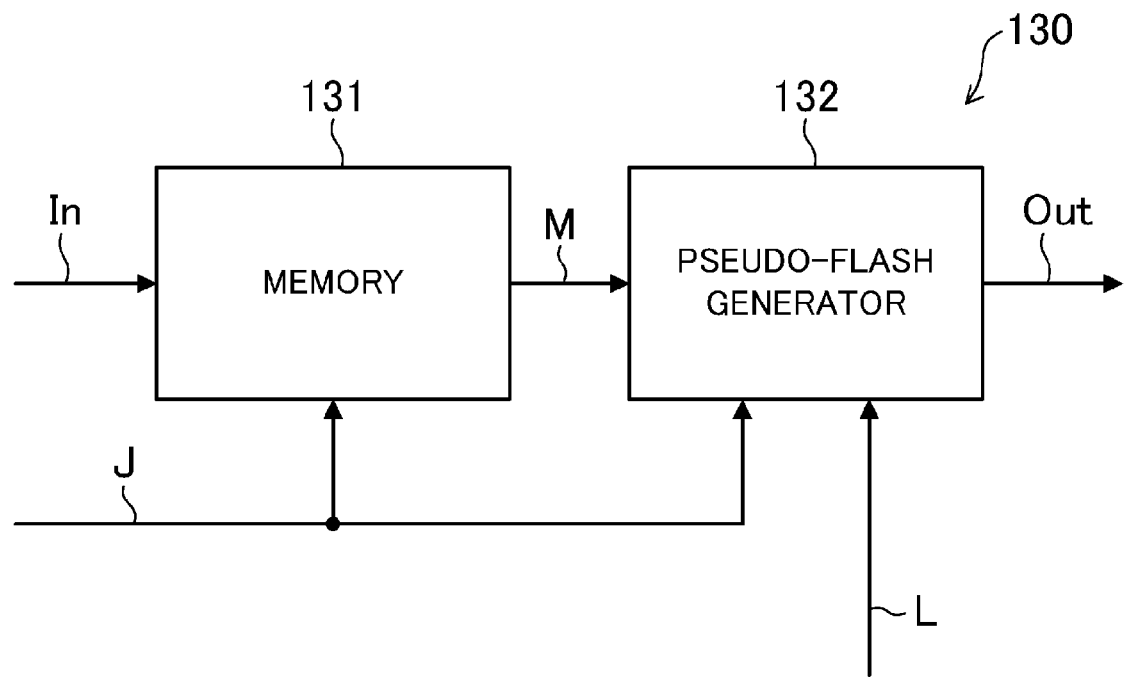
FIG. 2 illustrates a detailed configuration of a flash band compensator of FIG. 1.

FIG. 2 illustrates a detailed configuration of the flash band compensator 130. The flash band compensator 130 includes a memory 131 and a pseudo-flash generator 132.

The memory 131 refers to flash band determination information J output from the flash band detector 120, and stores and outputs an image signal M of the latest frame, in which no flash band occurs, of previous frames.

The pseudo-flash generator 132 outputs an image Out in which a flash band is compensated for based on the image signal M, output from the memory 131, of the frame in which no flash band occurs, and the flash band determination information J and the flash band level L output from the flash band detector 120.

If the flash band determination information J is 0, the pseudo-flash generator 132 does not process anything, and outputs the image signal M output from the memory 131 without any change.

If the flash band determination information J is 1, the pseudo-flash generator 132 generates pseudo-flash for the output M output from the memory 131.

In order to generate a pseudo-flash image, the pseudo-flash generator 132 performs an offset process and a gain process for the output M from the memory 131.

A gain value to be multiplied and an offset value to be added are changed depending on luminance of an input image M. In view of the properties that when an object colored with black or white is lighted, the black object is less likely to reflect light while the white object is more likely to reflect light, the gain value to be multiplied is reduced if the luminance is smaller, while the gain value to be multiplied is increased if the luminance is larger. The gain value corresponding to a level of the luminance signal is multiplied for each pixel. The gain value is also changed depending on a flash band level L output from the flash band detector 120. The output value of each pixel can be expressed as follows:

$$YO = YI \times GY \times GL + OY$$

where YI is the luminance level of each input pixel, YO is the luminance level of each output pixel, GY is the gain value corresponding to luminance, GL is the gain value corresponding to the flash band level L, and OY is the offset value corresponding to the luminance level.

1-2. Operation of Imaging Device

Next, examples of the operation of the imaging device will be described.

1-2-1. Operation Example 1

Figure 3:
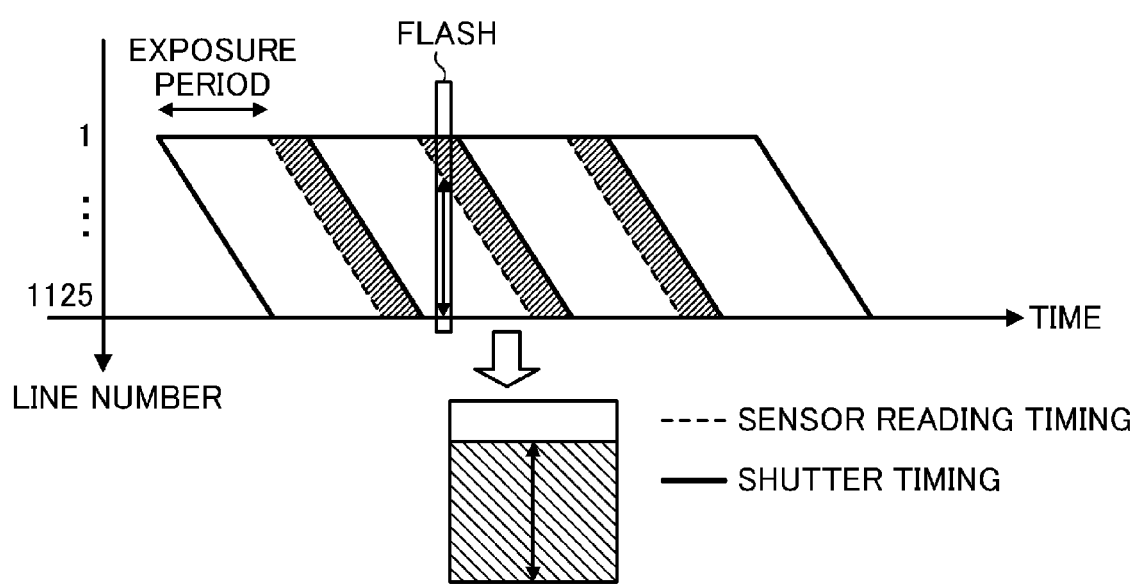
FIG. 3 illustrates a timing diagram of an operation example 1 of the imaging device in FIG. 1 where a flash band occurs in only one frame in an image signal In of FIG. 1 when a shutter operation is performed.

FIG. 3 shows a case where a flash band occurs in only one frame in an image signal In of FIG. 1 when a shutter operation is performed. As shown in the figure, in imaging devices using a rolling shutter technique, the larger the line number is, the wider the shift of the exposure period in the line from the exposure period in line 1 is. Hatching inclined downward to the left in FIG. 3 shows a non-exposure period due to a shutter operation. When flash is emitted under such a condition at the timing shown in FIG. 3, a flash band occurs in only the lower half of one frame image, as shown by hatching inclined downward to the right in the one frame image.

The technique for adding image signals of two consecutive frames in International Patent Publication No. WO 2010/100866 cannot correct such a flash band occurring in only one frame.

FIGS. 4A-4D shows specific examples of a flash band compensation in the present disclosure when a flash band occurs in only one frame. The numbers shown in FIG. 4A indicate a frame number of an input signal.

The flash band detector 120 outputs portions of flash band determination information J1-J4 with respect to In1-In4 output from the imager 110. In the case of FIG. 4B, a flash band occurs in only the frame number 2, J2 is 1, and J1, J3, and J4 are 0. The flash band compensator 130 refers to flash band determination information J output from the flash band detector 120 in the memory 131, and outputs an image M including no flash band. In the case of FIG. 4C, J2 is 1, and therefore, M2 is In1. J1, J3, and J4 are 0, and therefore, M1 is In1, M3 is In3, and M4 is In4.

The image M including no flash band output from the memory 131 is input into the pseudo-flash generator 132. In the case of FIG. 4D, J2 is 1, and J1, J3, and J4 are 0, and therefore, a pseudo-flash process is performed with respect to only M2, and Out2 (M1') is output. The prime symbol (') indicates that the pseudo-flash process is performed. M1, M3, and M4 are output as Out1, Out3, and Out4, respectively, without any change.

As a result, as shown in the outputs of FIG. 4D, an image on which no flash band appears can be obtained.

1-2-2. Operation Example 2

Figure 5:
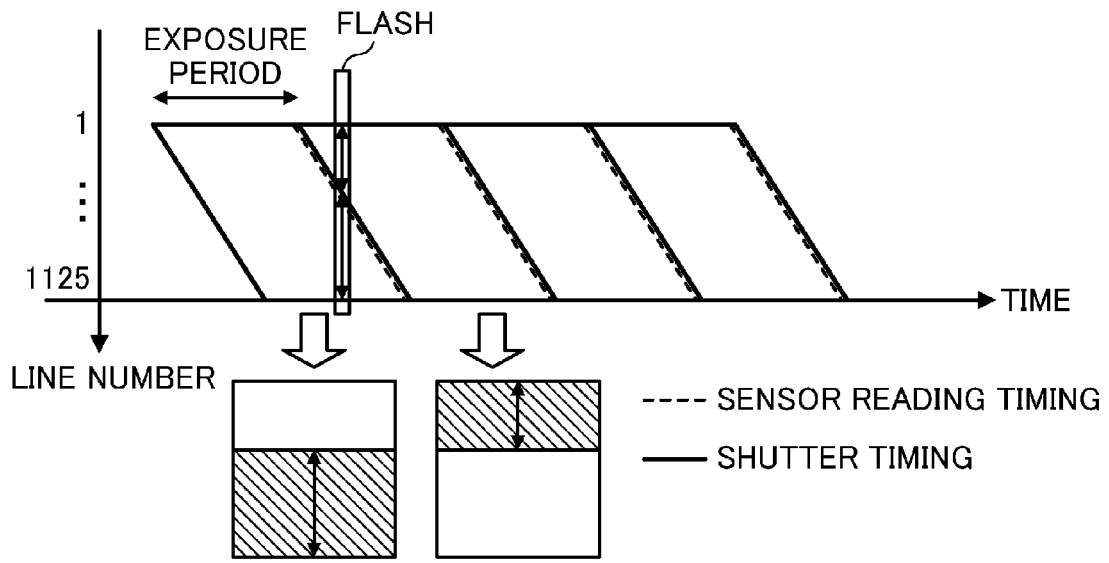
FIG. 5 illustrates a timing diagram of an operation example 2 of the imaging device in FIG. 1 where a flash band occurs in each of two consecutive frames in the image signal In of FIG. 1 when a shutter operation is not performed.

FIG. 5 shows a case where a flash band occurs in each of two consecutive frames in the image signal In of FIG. 1 when a shutter operation is not performed. A sensor reading timing and a shutter timing coincides with each other, and the sensor can fully expose flashed images to light, and flash bands are vertically complementary.

Figure 6:
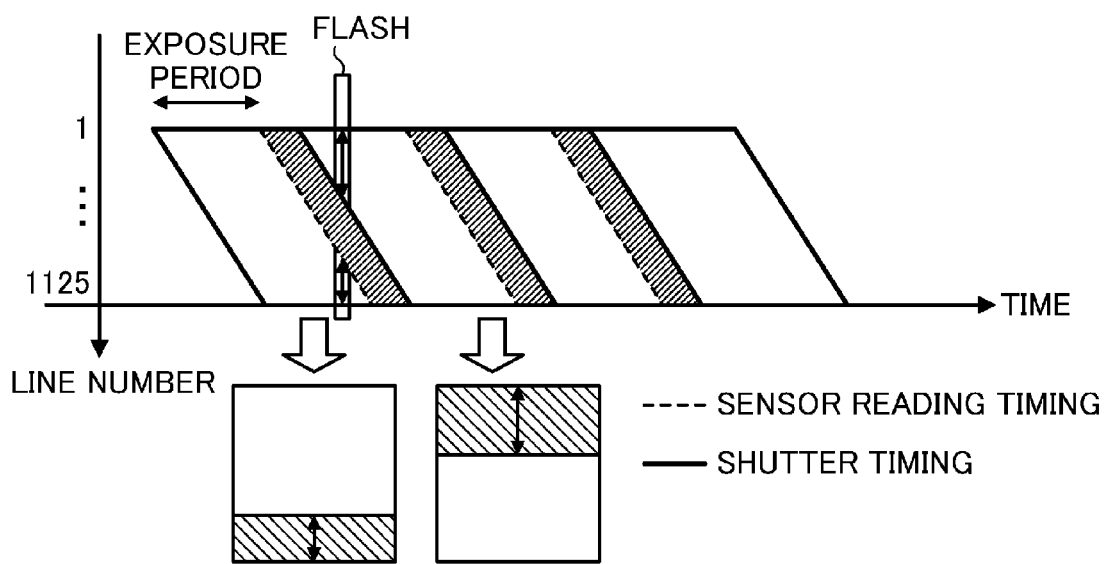
FIG. 6 illustrates another timing diagram of the operation example 2 of the imaging device in FIG. 1 where a flash band occurs in each of two consecutive frames in the image signal In of FIG. 1 when a shutter operation is performed.

FIG. 6 shows a case where a flash band occurs in each of two consecutive frames in the image signal In of FIG. 1 when a shutter operation is performed. In this case, there is a time at which flashed images are not exposed to the sensor, and as a result, non-complementary flash bands occur in a vertical direction.

The technique for adding image signals of two consecutive frames in International Patent Publication No. WO 2010/100866 can correct the complementary flash bands as shown in FIG. 5. However, such a technique cannot correct the non-complementary flash bands as shown in FIG. 6. In other words, when a shutter operation is performed, flash bands are not necessarily complementary, and in such a technique, if the image signals of the frames are added, a part of the image is disadvantageously dark.

The present disclosure can solve this problem as described below.

FIGS. 7A-7D show an example of a flash band compensation in the present disclosure when a flash band occurs in each of two frames.

The flash band detector 120 outputs portions of flash band determination information J1-J4 with respect to In1-In4 (FIG. 7A) output from the imager 110. In the case of FIG. 7B, a flash band occurs in each of frame numbers 2, and 3, and therefore, J2 is 1, J3 is 1, and J1 and J4 are 0.

The flash band compensator 130 refers to flash band determination information J output from the flash band detector 120 in the memory 131, and outputs an image M including no flash band. In the case of FIG. 7C, J2 and J3 are 1, and therefore, M2 and M3 are In1. J1 and J4 are 0, and therefore, M1 is In1, and M4 is In4.

The image M including no flash band and output from the memory 131 is input into the pseudo-flash generator 132. In the case of FIG. 7D, J2 and J3 are 1, and J1 and J4 are 0, and therefore, a pseudo-flash process is performed with respect to M2 and M3, and Out2 (M1') and Out3 (M1') are output. M1 are M4 are output as Out1 and Out4, respectively, without any change.

As a result, as shown in the outputs of FIG. 7D, an image on which no flash band appears can be obtained regardless of performing a shutter operation or not.

1-2-3. Operation Example 3

FIGS. 8A-8D show a case where a frame to which full-frame flash is emitted is provided between two frames each including a flash band. The full-frame flash means that the effect of the flash appears on the entire one frame. This case may occur in, e.g., a press conference in which many reporters emit flash in a scene prior to or after a specific scene.

The flash band detector 120 outputs portions of flash band determination information J1-J4 with respect to In1-In4 (FIG. 8A) output from the imager 110. In the case of FIG. 8B, a flash band occurs in each of frame numbers 2, and 4, and therefore, J2 is 1, and J4 is 1, and J1 and J3 are 0.

The flash band compensator 130 refers to flash band determination information J output from the flash band detector 120 in the memory 131, and outputs an image M including no flash band. In the case of FIG. 8C, J2 and J4 are 1, and therefore, M2 is In1 and M4 is In3. J1 and J3 are 0, and therefore, M1 is In1, and M3 is In3.

The image M including no flash band output from the memory 131 is input into the pseudo-flash generator 132. In the case of FIG. 8D, J2 and J4 are 1, and J1 and J3 are 0, and therefore, a pseudo-flash process is performed with respect to M2 and M4, and Out2 (M1') and Out4 (M3') are output. M1 are M3 are output as Out1 and Out3, respectively, without any change.

As a result, as shown in the output of FIG. 8D, an image on which no flash band appears can be obtained.

1-3. Advantages

The imaging device 100 in this embodiment can correct flash bands even if the flash bands are non-complementary flash bands occurring under an environment with a shutter operation.

Other Embodiments

As described above, the first embodiment has been described as example techniques disclosed in the present application. However, the techniques according to the present disclosure are not limited to this embodiment, but are also applicable to embodiments where modifications, substitutions, additions, and omissions are made as appropriate. In addition, elements described in the first embodiment may be combined to provide a different embodiment.

Here, other embodiments will be now described.

In the first embodiment, the example has been described where the flash band compensation technique of the present disclosure is applied to an imaging device as one example of an image processor. However, the flash band compensation technique of the present disclosure is also applicable to image processors such as computers.

In the first embodiment, the case has been described where the gain value corresponding to luminance and the flash band level L is multiplied or the offset value corresponding to luminance and the flash band level L is added. However, the gain value or the offset value may be constant. A flash image may be generated by using a lookup table, not the addition or multiplication. GY has been described as the gain value whose level corresponds to a level of a luminance signal. However, GY may be a gain value whose level corresponds to a level of, e.g., color signals such as RGB.

In the first embodiment, the case has been described where the flash band detector 120 does not detect full-frame flash. If the full-frame flash can be detected, a pseudo-flash process may not be performed when an output image M output from the memory 131 corresponds to a frame to which full-frame flash is emitted.

In the first embodiment, the flash band compensator 130 performs a pseudo-flash process with respect to all the frames in which J is 1. However, the pseudo-flash process does not have to be performed with respect to all the frames in which J is 1. For example, if three or more frames in which J is 1 are consecutively provided, no pseudo-flash process is performed after the third frame, and image signals of frames after the third frame may be output without any change in view of reduction of uncomfortable viewing due to a temporary halt of the consecutive images.

The number of the frames used for the pseudo-flash process is optional. It is possible to use a frame posterior to the frame that is to be compensated for. However, it is convenient to use a frame prior to the frame that is to be compensated for rather than the posterior frame.

Various embodiments have been described above as example techniques of the present disclosure, in which the attached drawings and the detailed description are provided.

As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential.

Since the embodiment described above is intended to illustrate the techniques in the present disclosure, it is intended by the following claims to claim any and all modifications, substitutions, additions, and omissions that fall within the proper scope of the claims appropriately interpreted in accordance with the doctrine of equivalents and other applicable judicial doctrines.

The present disclosure provides a pseudo-flash image that can be replaced for a flash band image, and therefore, is applicable to image processors that output images in which realistic flash remains in news scene etc. The present disclosure is also applicable to image processors that correct a flash band even if a shutter is provided to reduce flicker.

What is claimed is:

1. An image processor processing consecutive images, the image processor comprising:
   circuitry configured to:
   determine whether each image of the consecutive images is a flash band image having a part affected by a flash; and
   if a first image of the consecutive images is determined as the flash band image,
   generate a new third image which simulates being fully affected by the flash, wherein the new image is based on a second image of the consecutive images which is not affected by the flash, and output the new image in place of the first image.

2. The image processor of claim 1, wherein the circuitry has a memory configured to record the second image of the consecutive images which is not affected by the flash, and a generator configured to generate the new image by using the second image recorded in the memory.

3. The image processor of claim 1, wherein the circuitry generates the new image by at least multiplying a gain value by the second image or adding an offset value to the second image.

4. The image processor of claim 3, wherein at least one of the gain value or the offset value is variable depending on a pixel value of each pixel.

5. The image processor of claim 3, wherein at least one of the gain value or the offset value is variable depending on a degree of an effect of the flash.

6. The image processor of claim 1, wherein the circuitry generates the new image from the second image by using a lookup table.

7. The image processor of claim 1, wherein after the number of consecutive flash band images reaches a predetermined number, the circuitry further outputs consecutive flash band images without any change after compensating for the predetermined number of the consecutive flash band images.

* * * * *